UNITED STATES PATENT OFFICE.

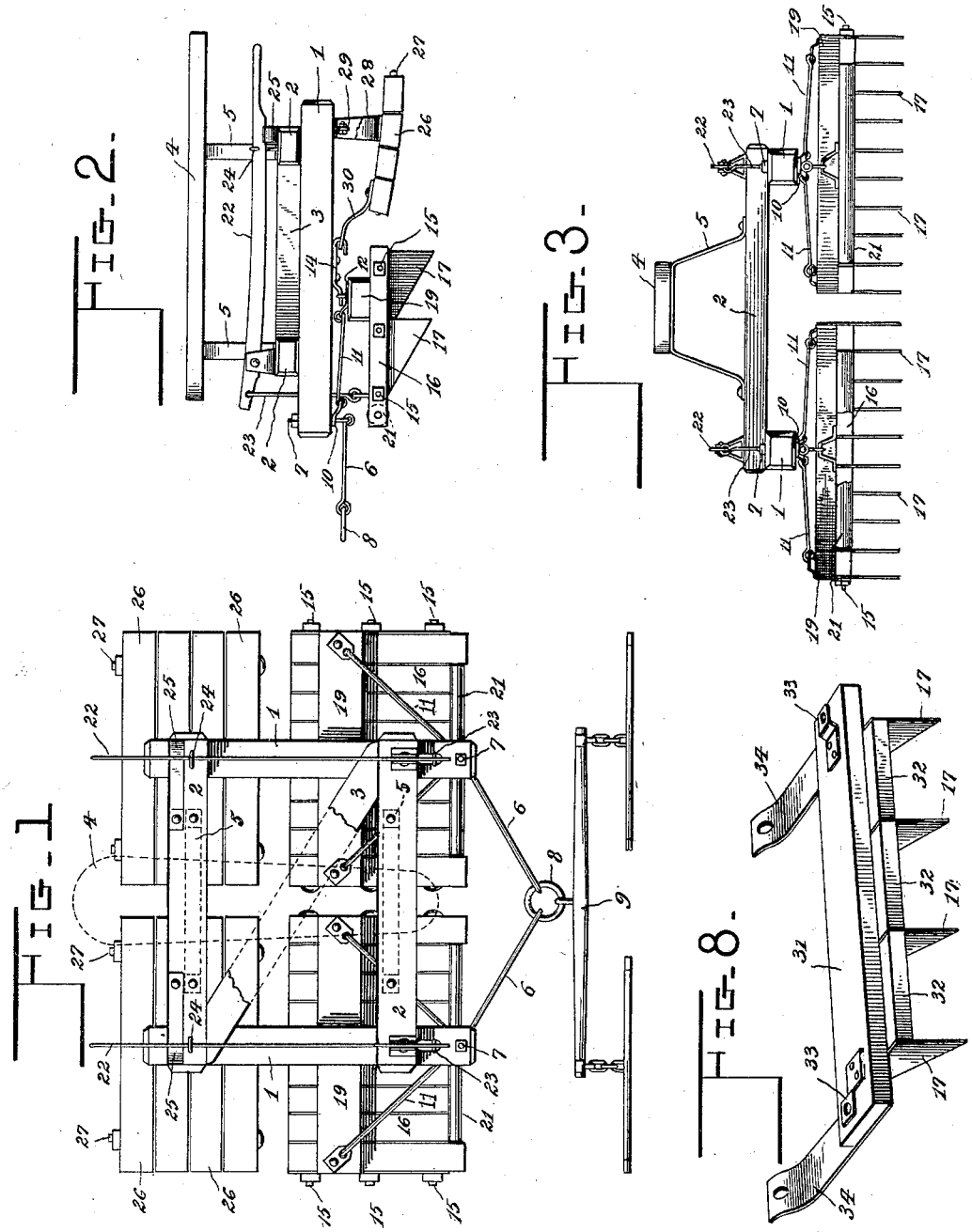

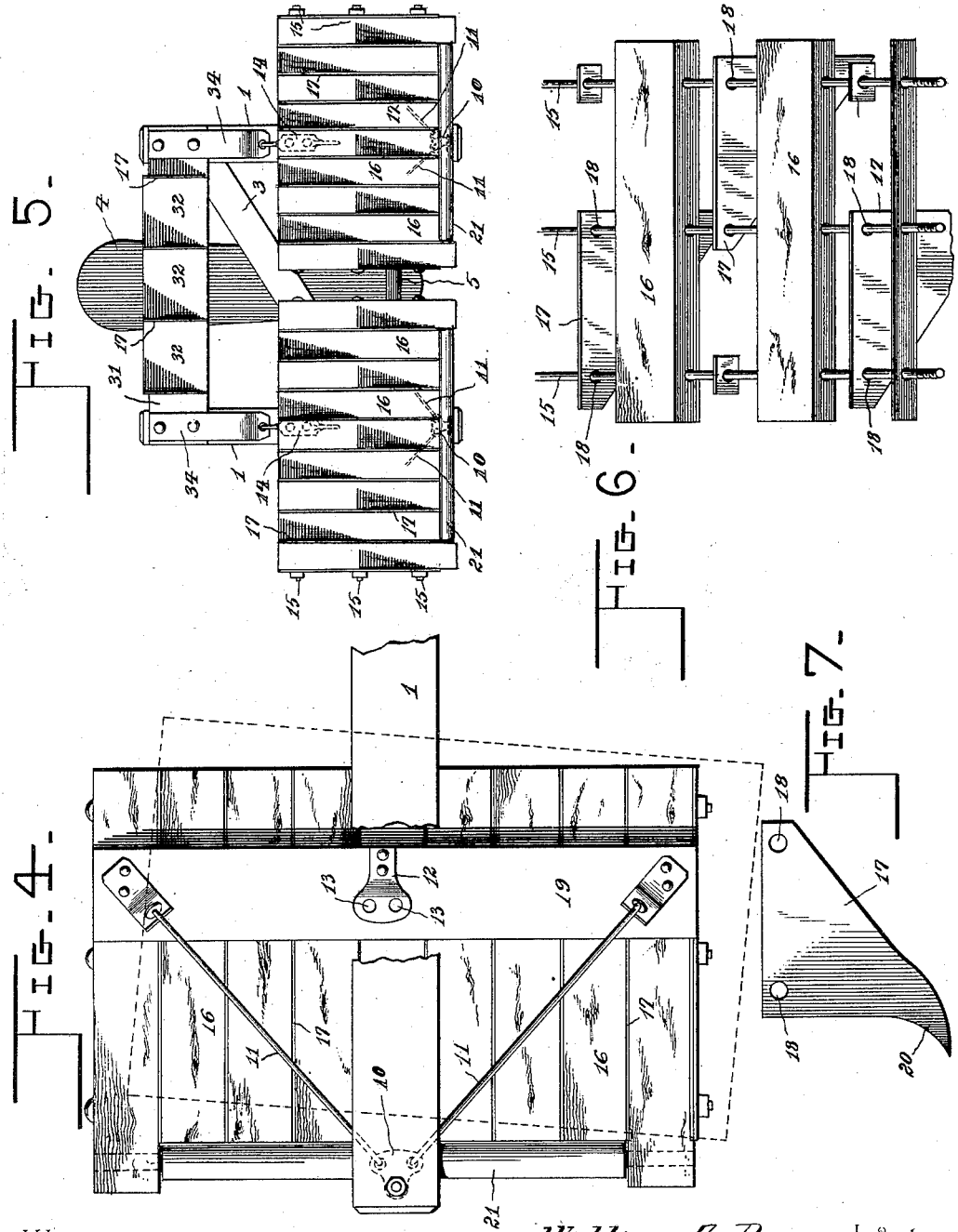

WILLIAM Z. BROWN, OF ATLAS, ILLINOIS, ASSIGNOR OF ONE-HALF TO LOUIS K. MARKO, OF SAME PLACE.

PULVERIZER.

SPECIFICATION forming part of Letters Patent No. 612,818, dated October 25, 1898.

Application filed April 21, 1898. Serial No. 678,422. (No model.)

*To all whom it may concern:*

Be it known that I, WILLIAM Z. BROWN, a citizen of the United States, residing at Atlas, in the county of Pike and State of Illinois, have invented a new and useful Pulverizer, of which the following is a specification.

This invention has relation to that class of agricultural implements designed primarily for pulverizing and leveling the soil preparatory to planting and which are adapted to be used for cultivating and covering the seed when sown.

The invention has for its object to reduce and materially lighten the draft and to provide for a thorough breaking up and pulverizing of the clods and lumps of earth, so as to place the soil in the best possible condition for the reception of seed.

The invention also has for its object to simplify and improve the general construction and provide for an adjustment of the sections to throw the earth laterally in either direction to a greater or less extent and enable repairs being quickly and cheaply made, the sections being mounted so as to readily conform to the nature of the surface over which the implement is passing.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a top plan view of a pulverizer constructed in accordance with this invention, the seat being shown by dotted lines and the middle portion of the brace of the main frame being broken away. Fig. 2 is a side elevation. Fig. 3 is a front view. Fig. 4 is a detail view showing an angular adjustment of the front pulverizing-section by dotted lines. Fig. 5 is a view of the implement inverted, showing the rear sections replaced by a single cutter-section. Fig. 6 is a detail view in perspective, showing the manner of constructing a cutter-section. Fig. 7 is a detail view in elevation of a modified form of cutter. Fig. 8 is a detail view of the rear cutter-section.

Corresponding and like parts are referred to in the following description and indicated in the several views of the drawings by the same reference characters.

The frame comprises longitudinal beams 1, front and rear transverse beams 2, rigidly connected at their ends to the longitudinal beams, and a brace 3. A plate 4 extends longitudinally of the implement and is disposed intermediate of its edges and is supported upon approximately inverted-V-shaped standards 5, attached to the transverse beam. The plate 4 forms a seat and extends from the front to the rear transverse beam, thereby enabling the weight of the driver to come upon the implement at any desired point, according to the condition of the ground over which the implement is traveling, so as to secure the best results. By throwing the weight upon the rear end of the plate or seat 4 the front portion of the implement is enabled to ride easily over the ground, and by bringing the weight nearer the front end of the plate the implement will ride over the ground less easily and the cutters will be forced to the work with greater pressure. Draft-bars 6 have loose connection at their rear ends with eyebolts 7, applied to the front ends of the beams 1, and their front ends have connection with a ring 8, to which a doubletree 9 is coupled and to which the team is hitched.

The implement comprises pairs of pulverizing or cutter sections and crushing or leveling sections, the sections of each pair alining transversely and having loose connection intermediate of their ends with longitudinal beams, so as to readily adapt themselves to inequalities in the surface over which the implement is drawn. The pulverizing or cutter sections are of similar formation and are connected with the respective longitudinal beams 1 in a like manner. A draft-plate 10 has loose connection with each eyebolt 7, so as to turn freely thereon, and rods 11, rearwardly divergent, are secured at their front ends to the draft-plate and have loose connection at their rear ends with the end portions of their respective pulverizing or cutter sections. A plate 12 is secured centrally of each pulverizing-section and is provided at its front end with transversely-disposed eyes 13, which are adapted to receive a hook applied to the bottom side of each of the longitudinal beams 1. By engaging one of the eyes 13 with a member of the double hook 14, secured to each of the beams 1, the pulverizing or cutter section may be caused to run with its cutters parallel with the line of motion of the machine, and by shifting the section so as to engage another of the eyes 13 with the hook 14 the cutter-section may be inclined, thereby throwing the cutters at an angle to the line of motion of the machine. This last adjustment of the cutter-section enables the cutters to throw the earth laterally, which is of advantage for cultivating purposes and for covering seed sown broadcast.

The pulverizing-sections are formed of a series of tie-rods 15, three in number being shown, spacing bars or pieces 16, and cutters 17, the latter being pierced and strung upon the tie-rods and spaced apart by the interposed filling-pieces 16. The cutters are plates of triangular form and are provided with openings 18 to receive a pair of tie-rods 15. These cutters are placed so that their lower or active edges incline downwardly and rearwardly, whereby the cutters operate by a shear action when the implement is in operation. The cutters are disposed in rows, and the cutters of each row are arranged to come opposite the spaces formed between the cutters of the adjacent row, thereby facilitating the action of the pulverizer. The series of cutters and spacing-pieces are connected by the tie-rods and are further strengthened by bars 19, secured to the upper side of each cutter-section. As shown in Fig. 7, the cutters 17 may have their lower rear ends curved rearwardly, as indicated at 20, this style of cutter being preferred for some kinds of work, as for cutting roots, sods, and the like. A roller 21 is applied to the front end of each pulverizing or cutter section and lightens the draft and prevents trash and like matter from accumulating and lodging upon the sections and enables the latter to ride over the same. The pulverizing or cutter sections are mounted so as to be capable of vertical movement, whereby they can be lifted to free the cutters of trash or other matter adhering thereto. This vertical movement is also of advantage in order to admit of the implement being readily turned. The means for lifting the pulverizing-sections consists of a lever 22, fulcrumed upon the main frame and having connection by means of a link 23 with the middle portion of the section, said link passing through a vertical opening or mortise in the longitudinal beam. Each of the levers 22 extends about parallel with the longitudinal beam to which it is fulcrumed, and its rear end is adapted to be engaged by a hook 24, applied to the outer end of the rear transverse beam. A spring 25 is secured to each end portion of the rear transverse beam 2 and is adapted to exert an upward pressure upon the rear end of the adjacent lever 22, so as to hold it in engagement with the hook 24. When the levers 22 are disengaged from the hooks 24, the cutter or pulverizing sections are permitted to penetrate the soil to their greatest extent, and when the rear ends of the levers are depressed and engaged with the hooks 24 the said sections are elevated, thereby withdrawing the cutters from the ground, either for clearing the sections of trash or permitting the implement to be turned prior to recrossing the field.

The crushing or leveling sections are composed of a series of bars or slats 26, which are strung upon and connected by rods 27. The bars or slats 26 extend transversely of the machine and at right angles to the spacing-bars and cutters of the pulverizing-sections. An arch 28 is applied centrally to the rear portion of each crushing-section and has an opening in its crown for the reception of a staple 29 or like fastening, applied to the rear end of each beam 1. A plate 30 is secured to the front end of each crushing-section, and its front portion curves upwardly and forwardly and has an opening to receive the rear hook of the double hook 14. The means just described loosely connect the crushing-sections with the main frame, so as to admit of their end portions rising and falling, thereby enabling the sections to conform to the surface condition of the ground over which the implement is moving.

When preparing the soil for planting, the pulverizing and crushing or leveling sections are applied in the manner set forth; but in the event of the soil containing roots and being of a turfy nature the crushing-sections are replaced by a cutter-section similar in construction to the pair of pulverizing-sections, but containing only a single row of cutters. This cutter-section is hitched or coupled to the hooked plates 14 and the staples 29 and consists of a bar 31, spacing-blocks 32, secured to the bar 31, and cutters 17, secured between the spacing-blocks. Plates 33 are secured to the end portions of the bar 31 and are coupled to the staples 29, and other plates 34, similar in formation to the plates 30 of the crushing-sections, are applied to the end portions of the bar 31 and are adapted to make connection with the rear members of the double hooks 14.

The cutters 17 are struck from sheet-steel of suitable thickness, and being of triangular form and disposed with their inclined edges foremost they resist the strain imposed thereon when the implement is in active operation and readily penetrate clods and lumps and break up the same when the machine is in service. The cutters break up the clods and the crushing-sections pulverize the lumps of smaller size and serve to level the land and place it in best possible condition for receiving grain.

Having thus described the invention, what is claimed, and desired to be secured by Letters Patent, is—

1. In a pulverizer, the combination with the frame, of a pulverizing or cutter section having loose connection with the frame, a plate applied to the pulverizing-section and having transversely-alined openings, and a hook or like means applied to the frame and adapted to make engagement with either one of the openings of the plate whereby the pulverizing-section may be caused to run parallel with the line of motion of the machine or at an angle thereto, substantially as and for the purpose set forth.

2. In a pulverizer, the combination with the frame and a pulverizing-section, of means for loosely connecting the pulverizing-section with the frame to admit of it running parallel with the line of motion or angling thereto, and means under the control of the driver for raising and lowering the section, substantially as set forth.

3. In a pulverizer, the combination with the frame and a pair of pulverizing-sections alining transversely, of rearwardly-divergent rods having loose connection at their rear ends with the sections, draft-plates applied to the front or convergent ends of the rods, means connecting the draft-plates with the frame, draft-bars forwardly convergent and having their rear ends connected to the frame by the same means connecting the draft-plates thereto, and coupling means between the frame and the sections independently of the divergent rods, substantially as set forth.

4. In a pulverizer, the combination with the main frame, of front and rear pairs of sections each having loose connection intermediate of their ends with the frame to admit of the sections having independent movement, the front sections having cutters applied thereto for pulverizing and dividing the clods and lumps in advance of the rear sections which latter crush and level the soil, and means for raising and lowering the front sections, substantially as set forth.

5. In an agricultural implement for tilling the soil, the combination of tie-rods, cutters strung upon the tie-rods, and filling-pieces interposed between the cutters, substantially as described.

6. In an agricultural implement for tilling the soil, the combination of tie-rods, cutters strung upon the tie-rods, and filling-pieces interposed between the cutters and strung upon the tie-rods, substantially as set forth.

7. In an agricultural implement for tilling the soil, the combination of a series of tie-rods, front and rear cutters strung upon the tie-rods and having an alternate relation whereby the cutters of one row come opposite the spaces between the cutters of the adjacent row, the rear ends of the front cutters and the front ends of the rear cutters being strung upon a tie-rod common to each, and spacing-blocks or filling-pieces interposed between the cutters and supported by the tie-rods, substantially as set forth.

8. In combination, a frame comprising longitudinal and transverse beams, a longitudinally-disposed plate supported upon the transverse beams and adapted to receive the weight of the driver at different points in its length, a pair of pulverizing-sections having loose connection with the front ends of the longitudinal beams and provided with cutters, levers mounted upon the longitudinal beams and having connection with the pulverizing-sections for raising and lowering them, and a rear pair of sections for crushing and leveling the soil having loose connection with the rear end portions of the longitudinal beams, substantially as set forth.

In testimony that I claim the foregoing as my own I have hereto affixed my signature in the presence of two witnesses.

WILLIAM Z. BROWN.

Witnesses:
F. L. FRAZIER,
GEORGE GEISEMDORFER.